(No Model.)
M. HARROLD.
DOUBLE ACTING SUCTION AND FORCE PUMP.
No. 389,886. Patented Sept. 25, 1888.
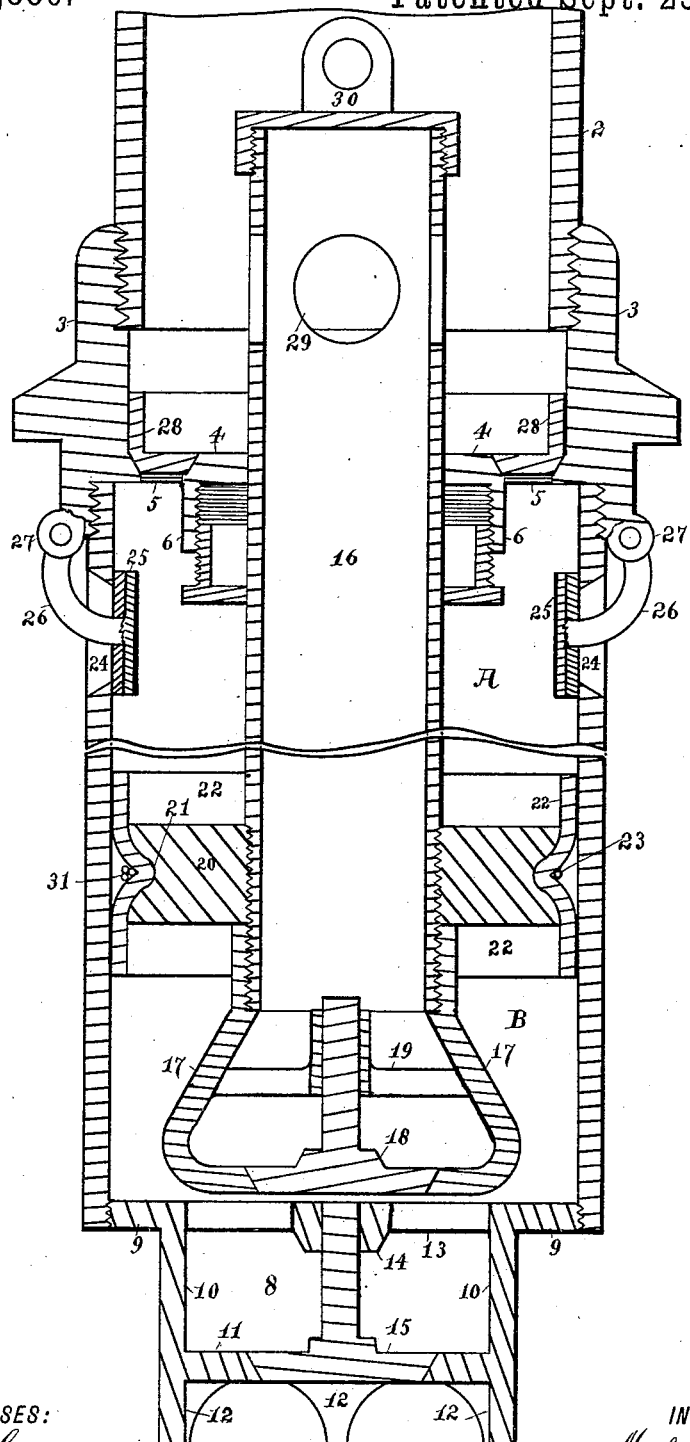
WITNESSES:
S. S. Gray
J. K. North
INVENTOR
Mahlon Harrold
BY R. W. McDermott
his
ATTORNEY

UNITED STATES PATENT OFFICE.

MAHLON HARROLD, OF DENVER, COLORADO.

DOUBLE-ACTING SUCTION AND FORCE PUMP.

SPECIFICATION forming part of Letters Patent No. 389,886, dated September 25, 1888.

Application filed May 12, 1888. Serial No. 273,752. (No model.)

*To all whom it may concern:*

Be it known that I, MAHLON HARROLD, a citizen of the United States, residing in the city of Denver, county of Arapahoe, and State of Colorado, have invented a new and useful Double-Acting Suction and Force Pump, of which the following is a specification.

My invention relates to the construction of combined double-acting suction and force pumps, and to the devices employed therein.

In some parts of the country there are what are called "bored wells," in contradistinction to dug, driven, and Artesian wells. Such bored wells are of very small diameter compared to ordinary dug wells, ranging ordinarily from five to eight inches in diameter only. The objects of my invention, therefore, are to furnish a double-acting suction and force pump of simple construction having the fewest number of parts possible for the ends to be attained, economical in first cost, durable, and of good wearing capacity, so as to require the minimum of repairs, reliable in operation, and which, though equally useful with and adapted for dug wells, cisterns, &c., shall be especially useful with and adapted for the bored wells referred to, being exceedingly compact, requiring a space of but a few inches in diameter for its reception, and which may be used as a totally or partially immersed pump. To which ends my invention consists in the devices and combinations more particularly hereinafter described and claimed.

In practicing my invention a main-pump cylinder of suitable length and diameter is used, from which rises a stand or conveying pipe for conveying the water from the pump to the desired point, and from which depends a valve cage or chamber containing an ordinary lift-valve controlling the inlet of the water to the cylinder below the piston. The cylinder and stand-pipe are united by a coupling in which is formed the seat for an annular valve placed at the top of the cylinder and controlling the outflow of water from the cylinder above the piston into the stand-pipe. The piston-rod is hollow, serving also to convey the water from the cylinder below the piston to the stand-pipe, into which it opens at or near its top. It is formed of a tube of suitable length and diameter, and carries the piston near its lower end, beneath which there is secured to it a valve cage or chamber containing an ordinary lift-valve controlling the admission of water from below the piston into the hollow piston-rod and thence into the stand-pipe. The piston thereon is formed with a metal disk secured upon the rod as the base or foundation of the piston, and upon its periphery is formed a circumferential groove. Upon the circumference is placed the leather, rubber, or material used as the packing, and over the same and opposite to the groove a wire or cord is tightly wound, forcing the center of the packing into the groove and securing it firmly in position, there being left on either side of the groove a plain surface to take against the wall of the cylinder.

Near the top of the cylinder and above the limit of the upper stroke of the piston are one, two, or more openings in the wall of the cylinder communicating directly from the interior of the cylinder to the exterior thereof, each such opening being fitted with or covered by an inwardly-opening valve. A novel, convenient, and effective form of such valve is a plain valve-surface to take upon the interior of the cylinder around the opening and secured to and carried by a curved or bent arm pivoted at its free end upon the exterior of the cylinder and above the valve and opening, such arm passing into the cylinder through the valve opening. As these curved or bent arms are pivoted above the valves they carry, each valve seeks by the force of gravity to place itself below the pivotal point of its arm, falling thereby into position over the opening it controls when not acted on by any extraneous force.

When possible to submerge the pump so constructed, it should be done. Then, as the piston rises, water rushes into the cylinder below the piston through the lower valve. As the piston descends such water is forced up through the hollow piston-rod into the stand-pipe, while water rushes into the space above the piston through the valve or valves above the piston. As the piston again rises, this last water is forced up into the stand-pipes through the annular valve at the head of the cylinder, so that the action of the pump is continuous, approximately equal volumes of water being drawn into the pump and lifted thence both upon the up and the down stroke of the piston.

The construction and operation of my improved pump, thus generally set forth, may be better understood by reference to the drawings accompanying this specification, in which the figure is a longitudinal sectional view of a pump embodying the invention.

In such drawings the reference-numeral 1 indicates the pump-cylinder proper, it being a tube of any suitable material and of a length and diameter suited to the position in which it is to be used. Above it rises the stand-pipe 2, leading to any desired point, and to which it is connected by the coupling 3. This coupling is provided with screw-threads upon the interior of either end for receiving and retaining an end each of the stand-pipe and the cylinder. A space is left in this coupling between the screw-threaded seats to form a place and a seat for the annular valve 28. The seat therefore is formed between the outer wall and the hub 4, the latter being secured to the outer wall by spokes or ribs 5. This hub is annular, the hollow piston-rod 16 passing therethrough. The annular valve 28 is provided with an upwardly-projecting wall rising from its outer edge, this wall serving to guide and steady the valve in its movements within its cage, its upward movement being limited by the lower end of the stand-pipe 2.

The hub 4 has a depending extension or wall, 6, screw-threaded to form with the cap 7 a stuffing or packing box, through which passes the hollow piston-rod 16. This tubular piston-rod is of such a length that its upper end never passes out of the stand-pipe at the lower end thereof. Upon its top is a lug or ear, 30, to which the rod descending from the power may be attached, or any other suitable means of fastening such rod to the piston-rod may be adopted. At the top of the piston-rod and within the stand pipe openings should be left or formed to permit the flow of water from the piston-rod into the stand-pipe. At its lower end the cylinder carries a valve-cage, 8, depending from an annulus or ring, 9, secured in the lower end of the cylinder. This valve-cage has a side wall, 10, at whose lower edge is the annulus 11, in which is seated the valve 15, whose stem passes through and is guided in a hub, 14, supported by ribs or spokes 13 13 from the annulus or ring 9.

The tubular piston-rod 16 carries at its lower end a valve-cage, 17, in which is seated the valve 18, whose stem passes through and is guided by a hub, 19, supported by ribs or spokes extending from the outer wall of the cage 17 to the hub 19. Upon the piston-rod and above this valve-cage is secured the piston. It consists of a disk, 20, attached to the rod and having a circumferential groove, 21, about midway of its periphery. Upon the disk is wound or wrapped the packing material 22, over which is then wound or wrapped tightly the cord or wire 23, tied or secured at its ends 31, the wrapping and tying forcing the packing into the groove, thus securely fastening the packing into position on the disk.

Above the upward limit of the stroke of the piston one or more openings, 24, are made into the cylinder. For and over each opening is a valve, 25, attached to an arm, 26, the valve being within the cylinder and opening inwardly while the arm passes through the opening to the exterior of the cylinder, the arm being bent or curved to permit this construction, and it is pivoted upon the exterior. A convenient means for such pivoting is by casting or forming a lug or ear, 27, one for each valve, upon the lower edge of the coupling 3, the arm being pivoted thereto. Thus arranged, it is seen, the valve normally falls over and closes the opening unless an extraneous force be brought to act against the exterior of the valve. For supporting the pump from and above the bottom of a well, so as to give free access for the water to the lower valve, 15, several legs or supports, 12, may be formed upon the lower end of the cage 8.

Thus constructed and arranged, the pump-cylinder being entirely submerged in the water and the parts in the position shown in the figure, the operation is as follows: As the piston is raised, water flows in through the valve 15 to fill the space B below the piston, the valve 18 remaining closed. This upward movement also forces the contents of space A out through the valve-opening at the top of cylinder, valve 28 rising as the piston rises, valves 25 remaining closed, the increased pressure in space A aiding gravity to that end. As the piston descends the valve 15 closes and 18 opens, the water in space B rising through the piston-rod into the stand-pipe. At the same time a vacuum is being formed in space A, and the pressure upon valve 28 closes it, while the pressure upon the exterior of the valve or valves 25, the interior pressure being reduced, causes them to open inwardly and water to flow into the space A. The piston again rising, forces the water up through valve 28, closing valves 25 and 18 and causing 15 to open and water to again flow into the space B. This action is continuous, one part of the cylinder being filled and one emptied into the stand-pipe upon every up and every down stroke of the piston. When the pump is not totally submerged, the openings 24 being above the top of the water, water is lifted and forced only to and from the lower portion, B, or the space beneath the cylinder; but even then it forms a very efficient and reliable pump, though its full capacity and efficiency are not attained except the cylinder 1 be immersed to a point above the valve-openings 24. In such position it forms a rapidly-acting pump, utilizing fully all the power applied to it and keeping up a constant stream through the stand-pipe to the delivery. It is simple, compact, and strong, and not likely to get out of order or have its working parts deranged by ordinary usage.

Having thus described my invention, what I claim is—

1. The combination of a pump-cylinder, 1, having a caged valve, 15, at its lower end and valve-openings 24 in its periphery, valves 25, lying within the cylinder and attached to curved or bent arms 26, pivoted without the cylinder to ears or lugs 27, a stand-pipe, 2, connected to the cylinder by a ring, 3, having hub 4, the annular valve 28, and the hollow piston-rod 16, substantially as set forth.

2. The combination of a pump-cylinder, a valve located at the lower end thereof, a stand-pipe rising therefrom, a ring-coupling uniting the cylinder and stand pipe and having a central annular hub forming a part of a valve-seat and a part of a stuffing-box surrounding the piston, a hollow piston-rod, a caged valve at the lower end thereof, a piston secured thereon above the valve and valves upon the interior of the cylinder and above the stroke of the piston therein, arms connected to such valves and passing out of the cylinder and pivoted to lugs or ears exterior thereto, such valves covering outlets in the cylinder and falling thereover in a vertical position by gravity, substantially as set forth.

In testimony whereof I have hereunto affixed my signature on this 13th day of December, 1887.

MAHLON HARROLD.

Witnesses:
L. F. WILBER,
PAT WHELAN.